US010732886B2

(12) United States Patent
Chopra et al.

(10) Patent No.: US 10,732,886 B2
(45) Date of Patent: Aug. 4, 2020

(54) APPLICATION DISTRIBUTED OPTIMAL BACKUP MODEL

(71) Applicant: EMC IP Holding Company LLC, Hopkinton, MA (US)

(72) Inventors: Shelesh Chopra, Bangalore (IN); Tushar B. Dethe, Bangalore (IN); Asif Khan, Bangalore (IN); Sunil Yadav, Bangalore (IN); Deepthi Urs, Bangalore (IN); Mahesh Reddy Av, Bangalore (IN); Swaroop Shankar Dh, Bangalore (IN)

(73) Assignee: EMC IP Holding Company LLC, Hopkinton, MA (US)

(*) Notice: Subject to any disclaimer, the term of this patent is extended or adjusted under 35 U.S.C. 154(b) by 125 days.

(21) Appl. No.: 16/028,685

(22) Filed: Jul. 6, 2018

(65) Prior Publication Data
US 2020/0012431 A1 Jan. 9, 2020

(51) Int. Cl.
*G06F 3/06* (2006.01)

(52) U.S. Cl.
CPC .............. *G06F 3/065* (2013.01); *G06F 3/067* (2013.01); *G06F 3/0619* (2013.01)

(58) Field of Classification Search
CPC ........ G06F 3/065; G06F 3/0619; G06F 3/067; G06F 11/1458; G06F 11/1461; G06F 11/1466; G06F 11/1469
See application file for complete search history.

(56) References Cited

U.S. PATENT DOCUMENTS

| | | | | |
|---|---|---|---|---|
| 9,516,108 B1 * | 12/2016 | Sullivan | ............... | G06F 11/1458 |
| 9,690,670 B1 * | 6/2017 | Paulzagade | ......... | G06F 11/1464 |
| 9,977,704 B1 | 5/2018 | Chopra et al. | | |
| 10,083,094 B1 * | 9/2018 | Thomas | ............... | G06F 11/1466 |
| 2016/0314020 A1 * | 10/2016 | Miller | ................. | G06F 11/3024 |

* cited by examiner

*Primary Examiner* — Tracy A Warren
(74) *Attorney, Agent, or Firm* — Chamberlain, Hrdlicka, White, Williams & Aughtry (57) ABSTRACT

A backup agent for generating backups includes a persistent storage and a backup manager. The persistent storage stores backup/restoration policies. The backup manager obtains production host computing resource characteristics associated with production hosts; performs a computing resource analysis of the production host computing resource characteristics to obtain resource profiles for each of the production hosts; performs an availability analysis of the obtained resource profiles to determine an application-level computing resources distribution for generating the backups; coordinates generating the backups using the application-level computing resource distribution and the backup/restoration policies to obtain the backups; and stores the obtained backups in backup storage.

18 Claims, 10 Drawing Sheets

APPLICATION DISTRIBUTED OPTIMAL BACKUP MODEL

BACKGROUND

Computing devices generate, use, and store data. The data may be, for example, images, documents, webpages, or meta-data associated with the data. The data may be stored on a persistent storage. Stored data may be deleted from the persistent storage.

A backup of the data stored on a computing device may be backed up by storing it on a second computing device. The second computing device may be geographically separated from the computing device.

Different computing devices in a distributed system may have different computing resources. For example, a first computing device may have 16 processing cores while a second computing device may have 4 processing cores. Differences in computing resources may preclude a one-size fits all approach in distribute systems.

SUMMARY

In one aspect, a backup agent for generating backups in accordance with one or more embodiments of the invention includes a persistent storage and a backup manager. The persistent storage stores backup/restoration policies. The backup manager obtains production host computing resource characteristics associated with production hosts; performs a computing resource analysis of the production host computing resource characteristics to obtain resource profiles for each of the production hosts; performs an availability analysis of the obtained resource profiles to determine an application-level computing resources distribution for generating the backups; coordinates generating the backups using the application-level computing resource distribution and the backup/restoration policies to obtain the backups; and stores the obtained backups in backup storage.

In one aspect, a method for generating backups in accordance with one or more embodiments of the invention includes obtaining production host computing resource characteristics associated with production hosts; performing a computing resource analysis of the production host computing resource characteristics to obtain resource profiles for each of the production hosts; performing an availability analysis of the obtained resource profiles to determine an application-level computing resources distribution for generating the backups; coordinating generating the backups using the application-level computing resource distribution and backup/restoration policies to obtain the backups; and storing the obtained backups in backup storage.

In one aspect, a non-transitory computer readable medium in accordance with one or more embodiments of the invention includes computer readable program code, which when executed by a computer processor enables the computer processor to perform a method for generating backups. The method includes obtaining production host computing resource characteristics associated with production hosts; performing a computing resource analysis of the production host computing resource characteristics to obtain resource profiles for each of the production hosts; performing an availability analysis of the obtained resource profiles to determine an application-level computing resources distribution for generating the backups; coordinating generating the backups using the application-level computing resource distribution and backup/restoration policies to obtain the backups; and storing the obtained backups in backup storage.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to systems, devices, and methods for generating backups. Embodiments of the invention may interrogate a distributed computing environment and identify a distribution of computing resources amongst native applications and backup generation sessions to both ensure rapid generation of the backups and the quality of services provided to clients of the native applications. Doing so may improve computing device technology in a distributed network by reducing the likelihood of data loss in the event of an unexpected interruption of execution of computing devices in the distributed network. Further, embodiments of the invention may improve the quality of service provide to users by reducing and/or eliminating phantoms slowdowns caused by the over consumption of computing resources for data integrity purposes.

Figure 1:
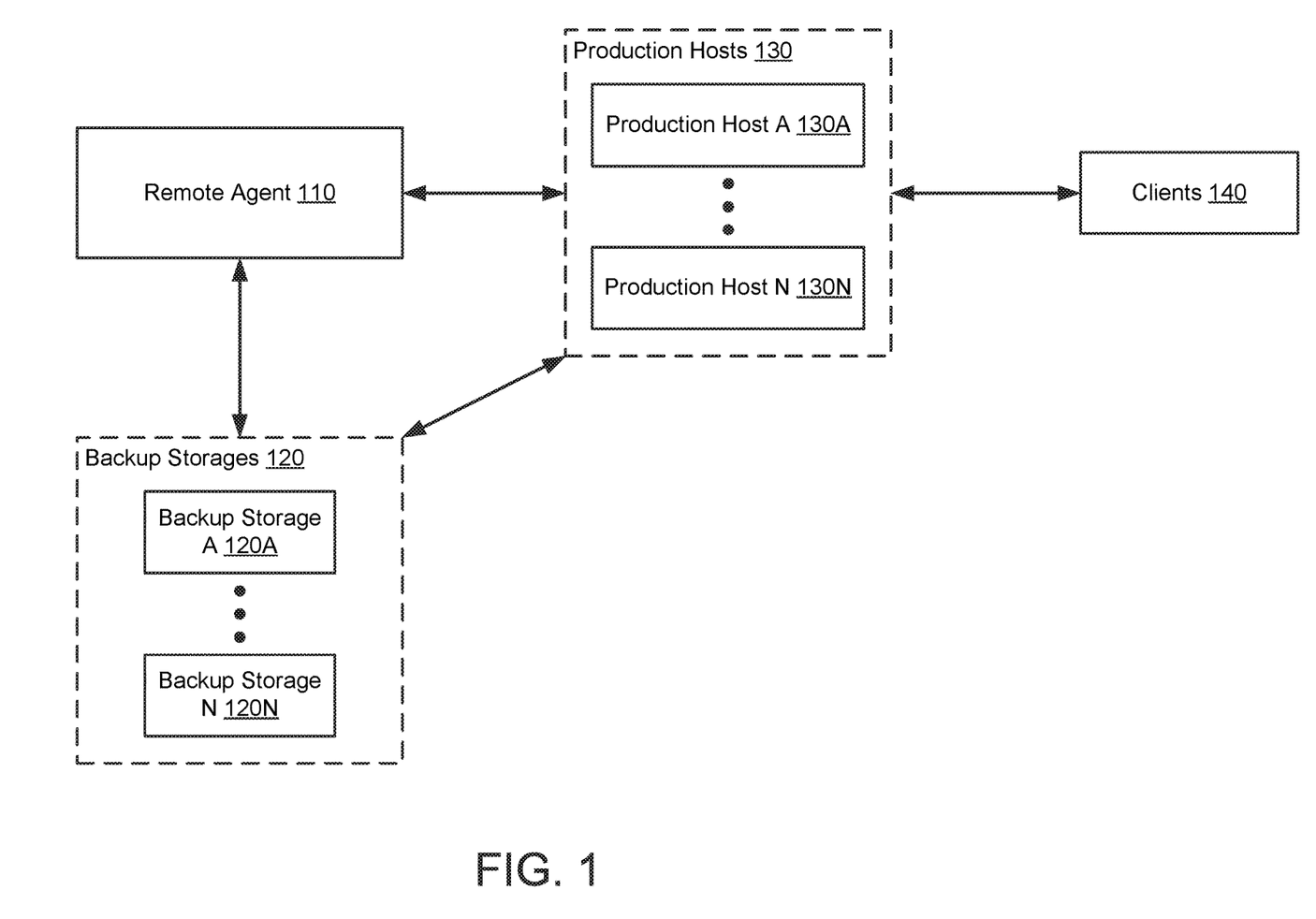
FIG. 1 shows a diagram of a system in accordance with one or more embodiments of the invention.

FIG. 1 shows an example system in accordance with one or more embodiments of the invention. The example system may be a distributed system. The system may include production hosts (130) that applications exposed to clients (140). The system may further include a remote agent (110) that provides services to the production hosts (130). The services may include data storage in backup storages (120) and restorations of applications using the data stored in the backup storages (120).

In one or more embodiments of the invention, the remote agent (110) may allocate computing resources of the production hosts (130) for restoration purposes. The remote agent (110) may do so by performing a computing resources analysis of production hosts to obtain resource profiles for the production hosts (130). The remote agent (110) may perform an availability analysis on the obtained resource profiles to determine an application-level computing resource distribution for backup generation purposes. The remote agent (110) may orchestrate backup generation for the production hosts suing the application-level computing resources distribution to obtain backups. By doing so, embodiments of the invention may improve the operation of a distributed system by optimizing the computing resources provided to different applications executing in the distributed system.

Each component of the system of FIG. 1 may be operably connected via any combination of wired and wireless connections. Each component of the system of FIG. 1 is discussed below.

The clients (140) may be computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions described in this application. The clients (140) may be other types of computing devices without departing from the invention. For additional details regarding computing devices, See FIG. 6.

The clients (140) may interact with applications hosted by the production hosts (130). For example, the applications may be databases, email servers, or any other type of application. The clients (140) may utilize services provided by these examples of applications or other application types hosted by the production hosts (130). By utilizing the services of the applications, data that is important to the clients (140) may be stored as part of application data for each respective application on the production hosts (130) or at other locations.

In one or more embodiments of the invention, the production hosts (130) are computing devices. The computing devices may be, for example, mobile phones, tablet computers, laptop computers, desktop computers, servers, distributed computing systems, or a cloud resource. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions described in this application. The production hosts (130) may be other types of computing devices without departing from the invention. For additional details regarding computing devices, See FIG. 6.

In one or more embodiments of the invention, the production hosts (130) are distributed computing devices. As used herein, a distributed computing device refers to functionality provided by a logical device that utilizes the computing resources of one or more separate and/or distinct computing devices. For example, in one or more embodiments of the invention, the production hosts (130) may be distributed devices that include components distributed across a number of separate and/or distinct computing devices. In such a scenario, the functionality of the production hosts (130) may be performed by multiple different computing devices without departing from the invention.

In one or more embodiments of the invention, the production hosts (130) host applications. The production hosts (130) may host any number of applications without departing from the invention. The production hosts (130) may also host agents, or other executing components, for orchestrating the operation of the hosted applications and for backup generation or restoration purposes. When generating backups and/or performing restorations, the production hosts (130) may allocate its computing resources based on instructions provided by a remote agent (110). Doing so may provide an improved backup generation process by optimizing the computing resources allocations for backup generation of different applications hosted by the production hosts (130). As will be discussed below, improper allocation of computing resources for backup generation purposes may increase the time required to generate the backups. Increased backup generation time may increase the likelihood of catastrophic data loss due to a failure of a production host during the backup generation. For additional details regarding the production hosts (130), See FIG. 2.

In one or more embodiments of the invention, the remote agent (110) is a computing device. The computing devices may be, for example, mobile phones, tablet computers, laptop computers, desktop computers, servers, distributed computing systems, or a cloud resource. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of remote agent (110) described in this application and all, or a portion thereof, of the methods illustrated in FIGS. 4A-4B. The remote agent (110) may be other types of computing devices without departing from the invention. For additional details regarding computing devices, See FIG. 6.

In one or more embodiments of the invention, the remote agent (110) is a distributed computing device. As used herein, a distributed computing device refers to functionality provided by a logical device that utilizes the computing resources of one or more separate and/or distinct computing devices. For example, in one or more embodiments of the invention, the remote agent (110) may be distributed devices that include components distributed across a number of separate and/or distinct computing devices. In such a scenario, the functionality of the remote agent (110) may be performed by multiple different computing devices without departing from the invention.

In one or more embodiments of the invention, the remote agent (110) provides services to the production hosts (130). The services may include storing of data and performing restoration. The data may be application data of applications hosted by the production hosts. After storing the data, the remote agent (110) may utilized the stored data to perform a restoration of the entity from which the data was obtained. For example, in a scenario in which the stored data is application data from an application, the stored data may be used to restore the application to a state associated with the stored data. The state may be the state of the application at a point in time during which the data was stored in the backup storage.

In one or more embodiments of the invention, the remote agent (110) allocation computing resources of the production hosts (130) for backup generation purposes. The remote agent (110) may perform the allocation based on resource analysis of the production hosts (130). For additional details regarding the remote agent (110), See FIG. 3.

In one or more embodiments of the invention, the backup storages (120) are computing devices. The computing devices may be, for example, mobile phones, tablet computers, laptop computers, desktop computers, servers, distributed computing systems, or a cloud resource. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device that cause the computing device to provide the functionality of the backup storages (120) described through this application and all, or a portion, of the methods illustrated in FIG. 4A-4B. For additional details regarding computing devices, See FIG. 6.

In one or more embodiments of the invention, the backup storages (120) are distributed computing devices. As used herein, a distributed computing device refers to functionality provided by a logical device that utilizes the computing resources of one or more separate and/or distinct computing devices. For example, in one or more embodiments of the invention, the backup storages (120) may be distributed devices that include components distributed across a number of separate and/or distinct computing devices. In such a scenario, the functionality of the backup storages (120) may be performed by multiple different computing devices without departing from the invention.

In one or more embodiments of the invention, the backup storages (120) store data from the production hosts (130). The data may be, for example, application data. Any quantity of application data may be stored in the backup storages (120) without departing from the invention. The application data may be associated with respective applications from which the application data was obtained.

In one or more embodiments of the invention, the backup storages (120) may deduplicate the application data against existing data stored in the backup storages. By deduplicating the application data, the quantity of data that it can stored in the backup storages may be increased when compared to storing the application without deduplication. To deduplicate the application, the backup storages (120) may only storing copies of unique portions of the application data. When storing the application data, the application data may first be checked to determine whether it is duplicative of data already stored in the backup storage. Only the unique portions of the application data may be stored in the backup storage. Storing and accessing deduplicated application data may be significantly more computing resource costly than storing application data that is not deduplicated.

Figure 2:
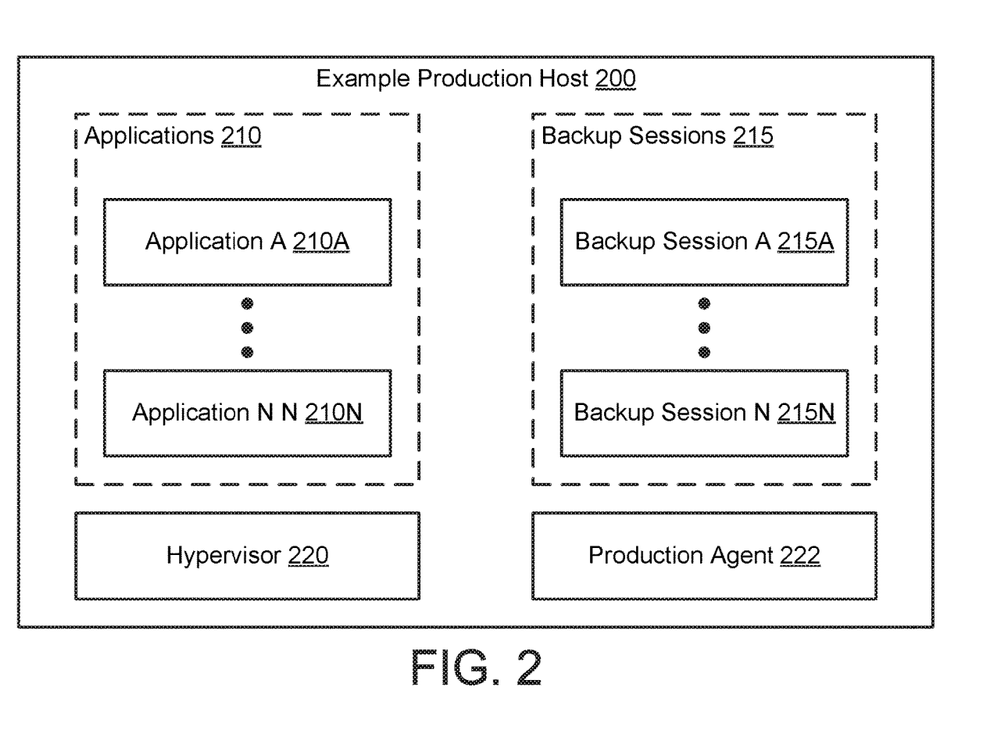
FIG. 2 shows a diagram of an example production host in accordance with one or more embodiments of the invention.

As discussed above, the backup storages may store data obtained from the production hosts (130). FIG. 2 shows a diagram of an example production host (200) in accordance with one or more embodiments of the invention.

In one or more embodiments of the invention, the example production host (200) hosts applications (210). The applications (210) may be, for example, databases, email applications, communication utilities, etc. The example production hosts (200) may host any number of applications (210A, 210N) without departing from the invention.

In one or more embodiments of the invention, the example production host (200) includes a hypervisor (220). The hypervisor (220) may allocation computing resources to the applications (210). For example, the hypervisor (220) may dedicate processor cycles, memory space, and storage space for use by the applications (220).

In one or more embodiments of the invention, the hypervisor (220) is a hardware device including circuitry. The hypervisor (220) may be, for example, a digital signal processor, a field programmable gate array, or an application specific integrated circuit. The hypervisor (220) may be other types of hardware devices without departing from the invention.

In one or more embodiments of the invention, the hypervisor (220) is implemented as computing code stored on a persistent storage that when executed by a processor performs the functionality of the hypervisor (220). The processor may be a hardware processor including circuitry such as, for example, a central processing unit or a microcontroller. The processor may be other types of hardware devices for processing digital information without departing from the invention.

In one or more embodiments of the invention, the example production host (200) includes a production agent (222). The production host (222) may orchestrate the generation of backups of the applications (210). To generate a backup of an application, the production host (222) may initiate a backup session. The production host (222) may initiate any number of backup sessions (215) without departing from the invention.

In one or more embodiments of the invention, a backup session is a thread, process, or other executing entity that generates a backup for an application. Thus, by implementing multiple backup sessions simultaneously, multiple backups may be generated in parallel. While the backup sessions (215) have been described as independent executing entities, the backup session (215) may be a single executing entity that generates backups of applications (210) in parallel without departing from the invention.

In one or more embodiments of the invention, the number of backup sessions (215) that are allowed to be concurrently performed is limited to a predetermined number. The predetermined number may be provided by a remote agent. Thus, the number of backup sessions (215) that may exist at any time may be limited to the predetermined number.

In one or more embodiments of the invention, the predetermined number varies depending on the resources of the production host. As will be discussed in greater detail with respect to the remote agent, the remote agent may determine the predetermined number for each production host and notify production agents executing on each production host of its predetermined number of backup sessions that may be concurrently executing at any point in time.

In one or more embodiments of the invention, the production agent (222) is remotely controlled by a remote agent. The production agent (222) may respond to data requests from the remote agent and perform actions as directed by the remote agent.

In one or more embodiments of the invention, the production agent (222) is a hardware device including circuitry. The production agent (222) may be, for example, a digital signal processor, a field programmable gate array, or an application specific integrated circuit. The production agent (222) may be other types of hardware devices without departing from the invention.

In one or more embodiments of the invention, the production agent (222) is implemented as computing code stored on a persistent storage that when executed by a processor performs the functionality of the production agent (222). The processor may be a hardware processor including circuitry such as, for example, a central processing unit or a microcontroller. The processor may be other types of hardware devices for processing digital information without departing from the invention.

Figure 3:
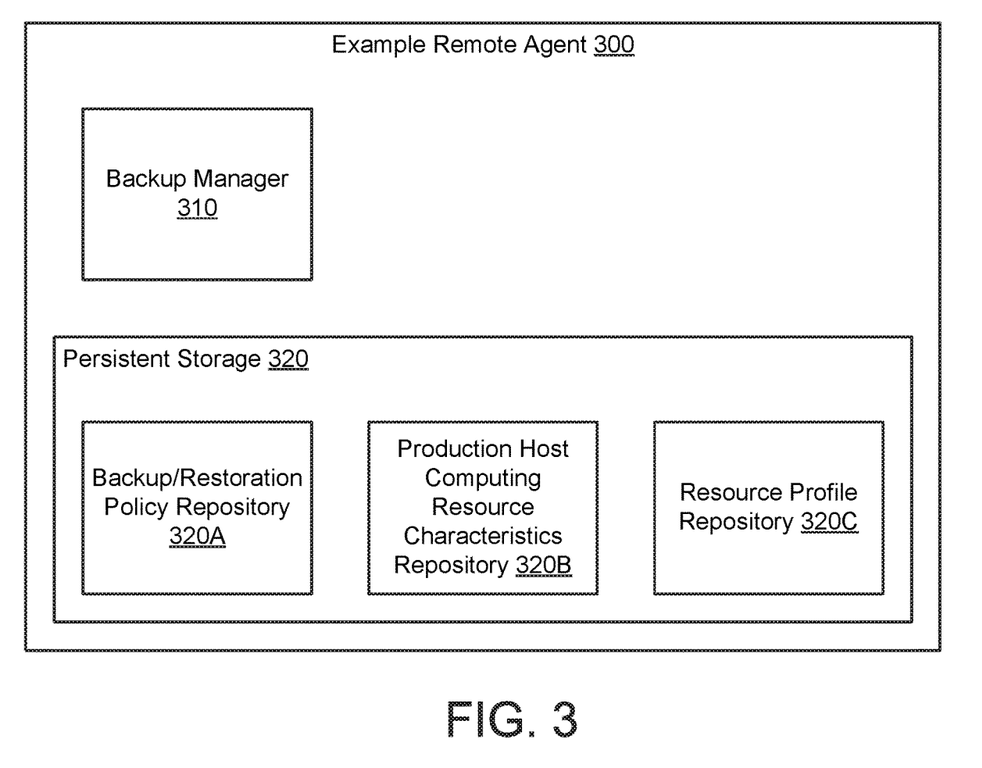
FIG. 3 shows a diagram of an example remote agent in accordance with one or more embodiments of the invention.

As discussed above, the remote agents may store data obtained from the production hosts in backup storage. FIG. 3 shows a diagram of an example remote agent (300) in accordance with one or more embodiments of the invention.

In one or more embodiments of the invention, the example remote agent (300) orchestrates the storage of application data in backup storage. The remote agent (300) may perform workflows for storing the application data. As a part or prior to the workflows, the example remote agent (300) may perform an analysis of the production hosts to determine how to allocation computing resources of the production hosts for backup generation purposes. Allowing too few backups to be generated in parallel may cause the backup generation process to take too much time. Allowing too many backups to be generated in parallel may, surprisingly cause the backup generation process to take too much time due to the overhead associated with parallelization. For a computing resource limited entity, over parallelization may cause context switches, and other artifacts of parallelization, that places a heavy computational burden on an already computing resource limited entity just for parallelization, let alone for backup generation.

In one or more embodiments of the invention, the example remote agent (300) determines an optimal computing resource allocation for backup generation purposes based on the number of cores available for processing data on a production host. The number of available cores may be used as a maximum number of allowed backup generation sessions to be performed concurrently, i.e., in parallel or overlapping in time. In one or more embodiments of the invention, the optimal computing resource allocation specifies the maximum number of backup sessions that may be performed in parallel or concurrently on each production host. The maximum number of backup sessions may be different for each production host and depend on the available computing resources and/or the computing resources that are being consumed on each production host by applications or other executing entities.

In one or more embodiments of the invention, the example remote agent (300) compares the number of cores to a requested maximum number of parallel or overlapping backup generation sessions. The requested maximum number may be obtained, for example, from a user, an administrator, or any other entity. The example remote agent (300) may use the smaller of the number of cores and the requested maximum number as the maximum allowed number of backup sessions that may be performed in parallel or in an overlapping in time manner.

In one or more embodiments of the invention, the example remote agent (300) determines an optimal computing resource allocation for backup generation purposes based on a quantity of memory available for processing data on a production host. The quantity of memory available may be used to identify a maximum number of allowed backup generation sessions to be performed concurrently, i.e., in parallel or overlapping in time. In one or more embodiments of the invention, the maximum number of allowed backup generation sessions is determined by dividing the quantity of available memory by a predetermined quantity of memory, e.g. 500 megabytes, and rounding to a whole integer number. The predetermined quantity of memory may be different from 500 megabytes without departing from the invention.

In one or more embodiments of the invention, the example remote agent (300) determines an optimal computing resource allocation for backup generation purposes based on a quantity of storage available for data storage on a production host. The quantity of storage available may be used to identify a maximum number of allowed backup generation sessions to be performed concurrently, i.e., in parallel or overlapping in time. In one or more embodiments of the invention, the maximum number of allowed backup generation sessions is determined by dividing the quantity of available storage by a predetermined quantity of storage, e.g. 10 gigabytes, and rounding to a whole integer number. The predetermined quantity of storage may be different from 10 gigabytes without departing from the invention.

In one or more embodiments of the invention, the example remote agent (300) determines an optimal computing resource allocation for backup generation purposes based on a minimum index of available processing, memory, and storage resources of a production host. The minimum index may be the lowest of the maximum number of allowed backup generation sessions discussed in the preceding three paragraphs. In other words, the maximum number of allowed backup generation sessions for each production host may be limited based on the computing resource that it has in least abundance.

In one or more embodiments of the invention, the maximum number of allowed backup generation sessions may be further limited based on a computing resource load applied to each production host by hosted applications. The average percentage of a production hosts computing resources consumed by applications may be used to reduce the maximum number of allowed backup sessions by a similar fraction. For example, if applications consume 40% of a production hosts computing resources on average and the production host has a maximum allowed number of backup sessions of 10, the maximum number of allowed backup sessions may be reduced to 6.

To provide the aforementioned functionality, the example remote agent (300) may include a backup manager (310) and a persistent storage (320). Each component of the example remote agent (300) is discussed below.

In one or more embodiments of the invention, the backup manager (310) orchestrates generation and storage of backups of applications executing on production hosts in backup storage. To provide the aforementioned functionality, the backup manager (310) may perform all, or a portion, of the methods illustrated in FIGS. 4A-4B.

Figure 4A:
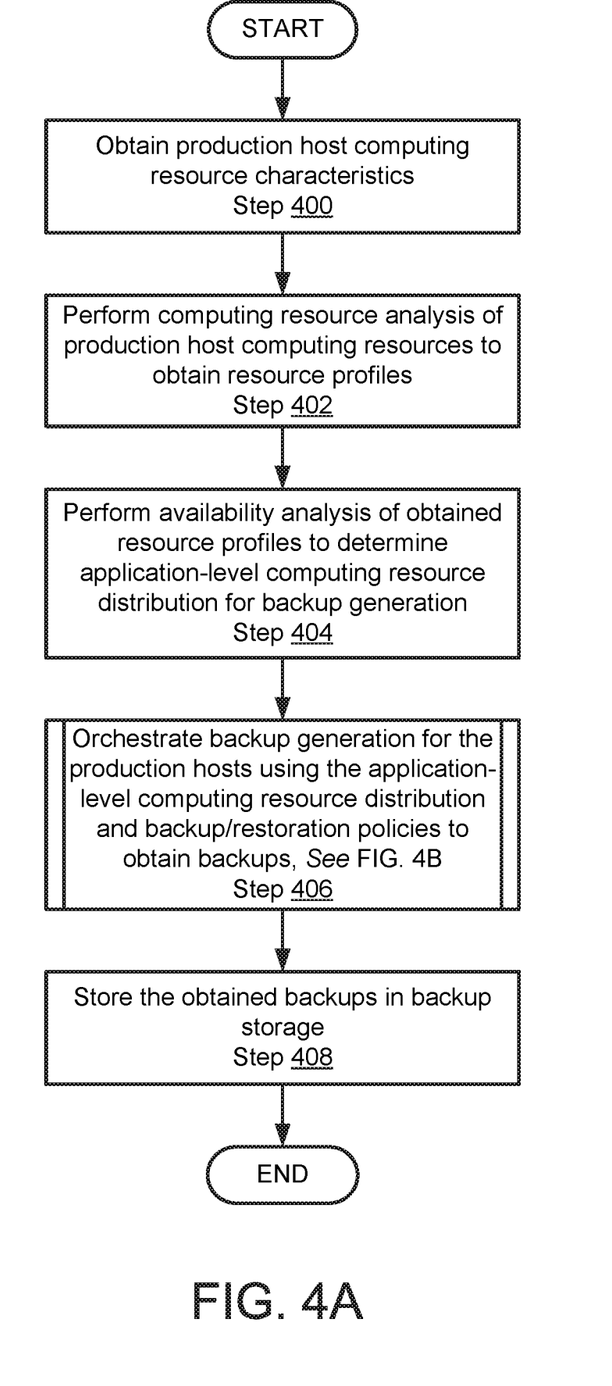
FIG. 4A shows a flowchart of a method of generating backups in accordance with one or more embodiments of the invention.
Figure 4B:
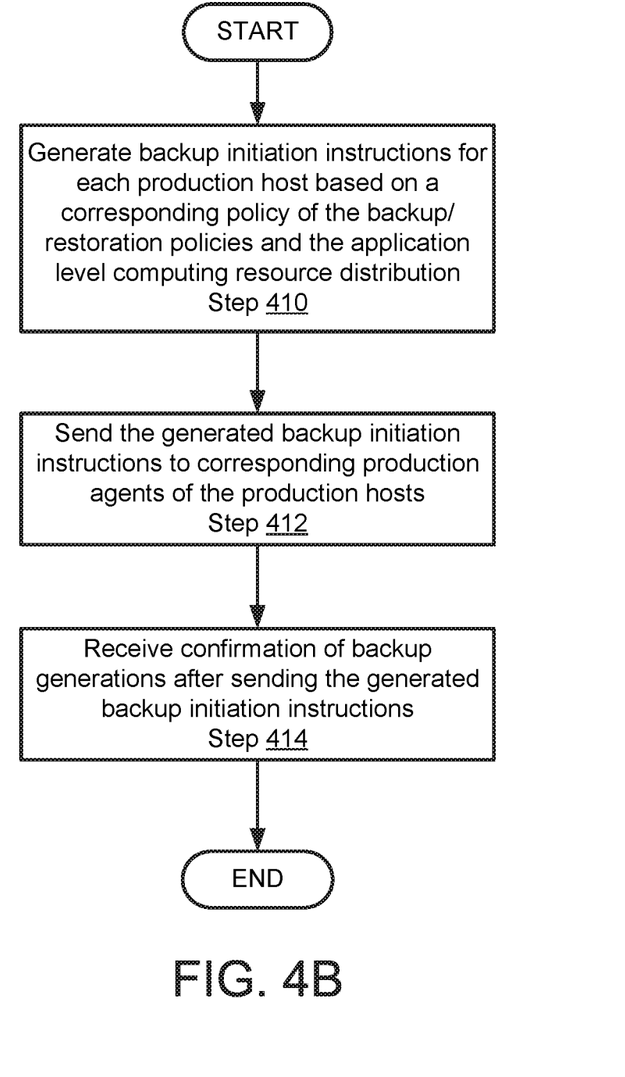
FIG. 4B shows a flowchart of a method of orchestrating generation of backups in accordance with one or more embodiments of the invention.

When performing the methods illustrated in FIGS. 4A-4B, the backup manager (310) may generate and/or utilize data structures stored in the persistent storage (320). For example, the backup manager (310) may read backup policies stored in the backup/restoration policy repository (320A) to determine a workflow for generating a backup of an application. Similarly, the backup manager (310) may determine computing resources of production hosts by reading the production host computing resource characteristics repository (320B). Based on its reading, the backup manager (310) may generate and/or update the resource profile repository (320C).

In one or more embodiments of the invention, the backup manager (310) is a hardware device including circuitry. The backup manager (310)) may be, for example, a digital signal processor, a field programmable gate array, or an application specific integrated circuit. The backup manager (310) may be other types of hardware devices without departing from the invention.

In one or more embodiments of the invention, the backup manager (310) is implemented as computing code stored on a persistent storage that when executed by a processor performs the functionality of the backup manager (310). The processor may be a hardware processor including circuitry such as, for example, a central processing unit or a microcontroller. The processor may be other types of hardware devices for processing digital information without departing from the invention.

In one or more embodiments of the invention, the persistent storage (320) is a storage device that stores data structures. The persistent storage (320) may be a physical or logical device. For example, the persistent storage (320) may include solid state drives, solid state drives, tape drives, and other components to provide data storage functionality. Alternatively, the persistent storage (320) may be a logical device that utilizes the physical computing resources of other components to provide data storage functionality.

In one or more embodiments of the invention, the persistent storage (320) stores a backup/restoration policy repository (320A). The backup/restoration policy repository (320A) may store policies. The policies may specify workflows for generating backups of applications hosted by the production hosts, or other entities, and/or specify workflows for restoring applications hosted by the production hosts, or other entities.

In one or more embodiments of the invention, the persistent storage (320) stores a production host computing resource characteristic repository (320B). The production host computing resource characteristic repository (320B) may store computing resource characteristics of each production host including one or more of: (i) the number of processor cores, (ii) the quantity of memory, and (iii) the quantity of storage. The computing resources characteristics of each production host may include additional, fewer, or different characteristics without departing from the invention.

In one or more embodiments of the invention, the persistent storage (320) stores a resource profile repository (320C). The resource profile repository (320C) may specify the available computing resources of a production host over time. In other words, the resource profile repository (320C) may specify an estimate of the available computing resources of the production hosts based on actual computing resources and estimated utilizations by applications or other entities executing using computing resources of the respective production hosts.

As discussed above, components of the system of FIG. 1 may perform methods of generating backups and performing restorations of applications, in addition to other functions.

FIGS. 4A-4B show methods in accordance with one or more embodiments of the invention that may be performed by components of the system of FIG. 1.

FIG. 4A shows a flowchart of a method in accordance with one or more embodiments of the invention. The method depicted in FIG. 4A may be used to generate a backup of an application in accordance with one or more embodiments of the invention. The method shown in FIG. 4A may be performed by, for example, a remote agent (e.g., 110, FIG. 1). Other components of the system illustrated in FIG. 1 may perform the method of FIG. 4A without departing from the invention.

In Step 400, production host computing resource characteristics are obtained.

In one or more embodiments of the invention, the production host computing resource characteristics are obtained by sending a request to a production agent executing in a production host. The production agent may obtain and provide the production host computing resource characteristics in response to the request.

In one or more embodiments of the invention, the production host computing resource characteristics are obtained from storage. The storage may include a repository that includes the production host computing resource characteristics. One or more entities of FIG. 1 may maintain the repository.

In Step 402, a computing resource analysis of the production host computing resources is performed to obtain resource profiles.

In one or more embodiments of the invention, the computing resource analysis is performed by estimating the computing resources consumed by executing entities hosted by the production host over time. The resource profiles may be obtained by generating them based on the estimates and actual computing resources of each production host specified in the production host computing characteristics.

In Step 404, an availability analysis of the obtained resource profiles is performed to determine an application-level computing resource distribution for backup generation.

In one or more embodiments of the invention, the availability analysis is performed by identifying points in time at which backup policies are likely to be triggered. The identified points in time may then be used to identifying the available, i.e., not in use, computing resources of the production host at the aforementioned points in time. The application-level computing resource distribution may be generated based on the available computing resources at the aforementioned points in time. For example, as described with respect to FIG. 3, a maximum number of simultaneous backup sessions may be identified based on available computing resources. The application-level computing resource distribution may specify the maximum allowed number of backup sessions that may be performed. The application-level computing resource distribution may specify a different maximum number for each production host.

In Step 406, a backup generation for the production hosts is orchestrated using the application-level computing resource distribution and backup/restoration policies to obtain backups.

In one or more embodiments of the invention, the backup generation for the production hosts is orchestrated via the method illustrated in FIG. 4B. Other methods of orchestrating the backup generation for the production hosts may be used without departing from the invention.

In one or more embodiments of the invention, orchestrating the backup generation limits the maximum number of backup sessions for each host to that specified in the application-level computing resource distribution. For example, the remote agent may notify a production agent of its respective maximum number of backup sessions. The production agent may only instantiate backup sessions, or otherwise generate backups in a parallel fashion, in parallel up to the prescribed maximum number.

In one or more embodiments of the invention, the backup/restoration policies may trigger the backup generation. For example, each backup policy may specify a trigger condition that, when met, triggers the generation of a backup. In this manner, the backup policies may specify when backups are generation.

In Step 408, the obtained backups are stored in backup storage.

The method may end following Step 408.

FIG. 4B shows a flowchart of a method in accordance with one or more embodiments of the invention. The method depicted in FIG. 4B may be used to orchestrate backup generation in accordance with one or more embodiments of the invention. The method shown in FIG. 4B may be performed by, for example, a remote agent (e.g., 110, FIG. 1). Other components of the system illustrated in FIG. 1 may perform the method of FIG. 4B without departing from the invention.

In Step 410, backup initiation instructions for each production host are generated based on a corresponding policy of the backup/restoration policies and the application-level computing resource distribution.

In one or more embodiments of the invention, the backup initiation instructions for each production host specify the maximum number of backup sessions for the respective host. In one or more embodiments of the invention, generation of the backup initiation instructions is triggered by the corresponding policy, i.e., a triggered policy.

In Step 412, the generated backup initiation instructions are sent to corresponding production agents of the production hosts.

In Step 414, confirmations of backup generations are received after sending the generated backup initiation instructions.

In one or more embodiments of the invention, the confirmations are received as the backups are generated. In other words, due to the limits on the maximum number of backup sessions, the backups may be generated over time. The confirmations may be sent to the remote agent as the backups are generated. Receiving a confirmation may prompt the remote agent to take action by storing the generated backup in remote storage. In one or more embodiments of the invention, the production host that generated the backup stores the generated backup in backup storage, as opposed to a remote agent.

The method may end following Step 414.

To further clarify aspect of the invention, a non-limiting example is shown in FIGS. 5A-5D. The system illustrated in FIGS. 5A-5D may be similar to that of FIG. 1 but for the sake of brevity only a portion of the components are illustrated.

EXAMPLE

Figure 5A:
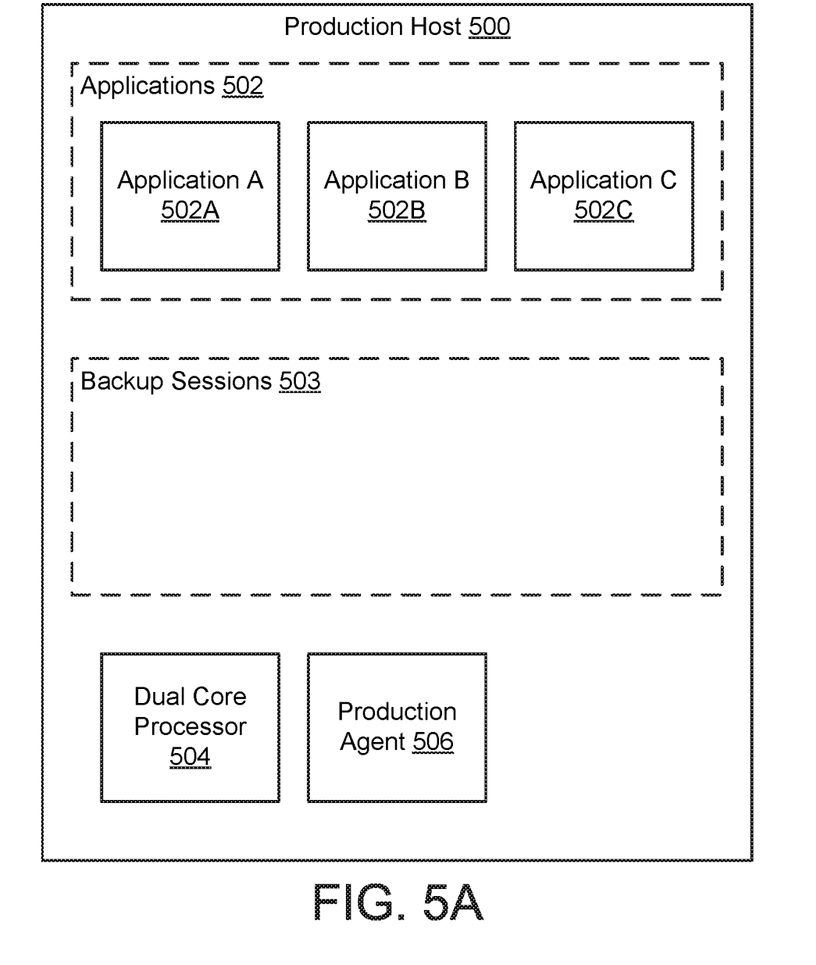
FIG. 5A shows a diagram of an example system at a first point in time.

Consider a scenario in which a production host (500) is hosting three applications (502) as illustrated in FIG. 5A. To support execution of the applications (502), the production host (500) includes a dual core processor (504). At the point in time illustrated in FIG. 5A, a user has requested that a maximum of 3 backup sessions be performed in parallel for backup generation purposes. However, doing so would overload the production host (500) because of the limited computing resources available to it, e.g., the dual core processor (504).

Figure 5B:
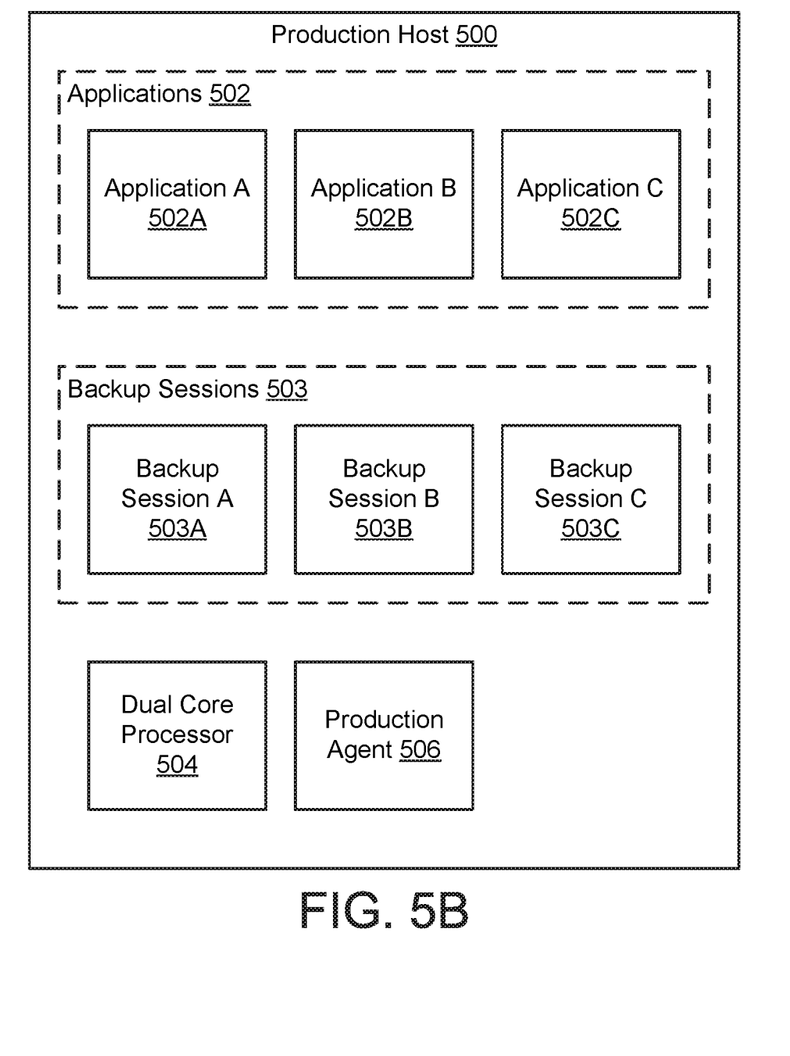
FIG. 5B shows a diagram of the example system of FIG. 5A at a second point in time.

To improve the reliability of services provided by the applications (500), backup policies (not shown) for the applications (502) will be triggered at a second point in time. Prior to the second point in time, a remote agent (not shown) performs portions a traditional backup generation process. As part of the traditional backup generation process, a production agent (506) instantiates the three backup sessions (503) as illustrated in FIG. 5B. However, doing so overloads the production host (500) resulting in a poor service provided to users of the applications (502) during backup generation and extending the backup generation time due to context switching caused by the limited processing resources.

To improve the backup generation process, the remote agent next performs portions of the methods illustrated in FIG. 4A-4B and determines that the maximum number of allowed backup sessions is 2. The number of allowed backup sessions is compared to the requested number and, because the allowed backup sessions is smaller than the requested number, the maximum number of allowed sessions of 2 is used.

Figure 5C:
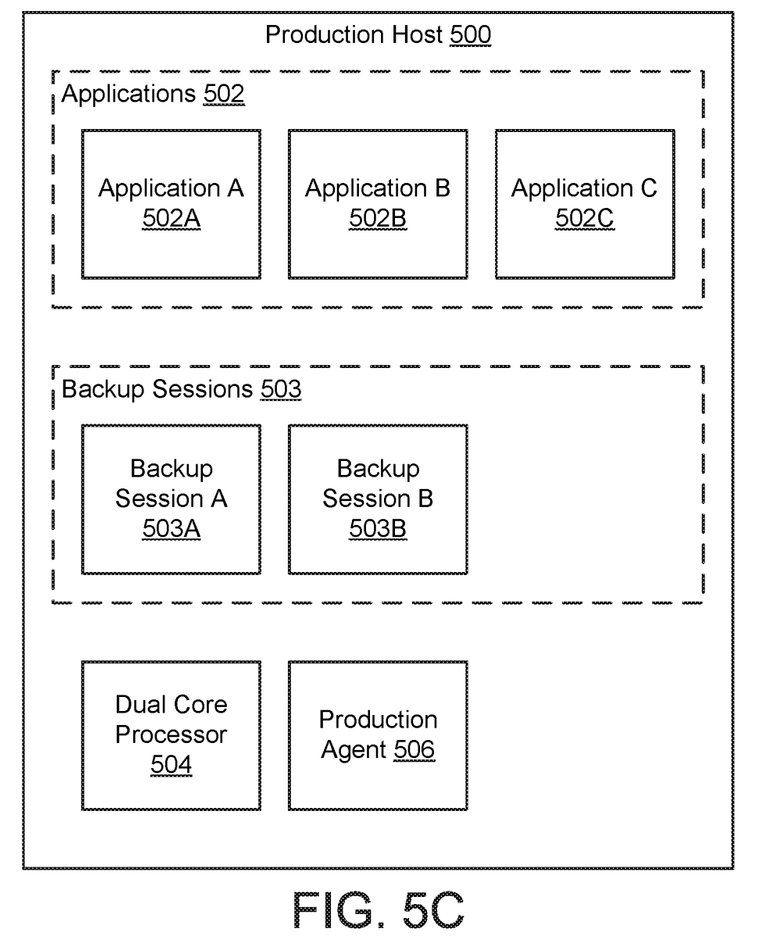
FIG. 5C shows a diagram of the example system of FIG. 5A at a third point in time.

At a third point in time, a backup policy triggers a backup generation and production agent (506) only instantiates two backup sessions (503A, 503B) as illustrated in FIG. 5C. Due to the lower computing load placed on the production host (500), the quality of service provided by the applications (502) is maintained during the backup generation and the backup generation time is minimized.

Concerned with further enhancing the quality of service provided to client by the applications (502) during backup generation sessions, a user further limits the requested number of backup sessions to 1. Because the user requested number is less than the maximum number of allowed backup generation sessions, the user requested number is used as the maximum number of allowed backup sessions.

Figure 5D:
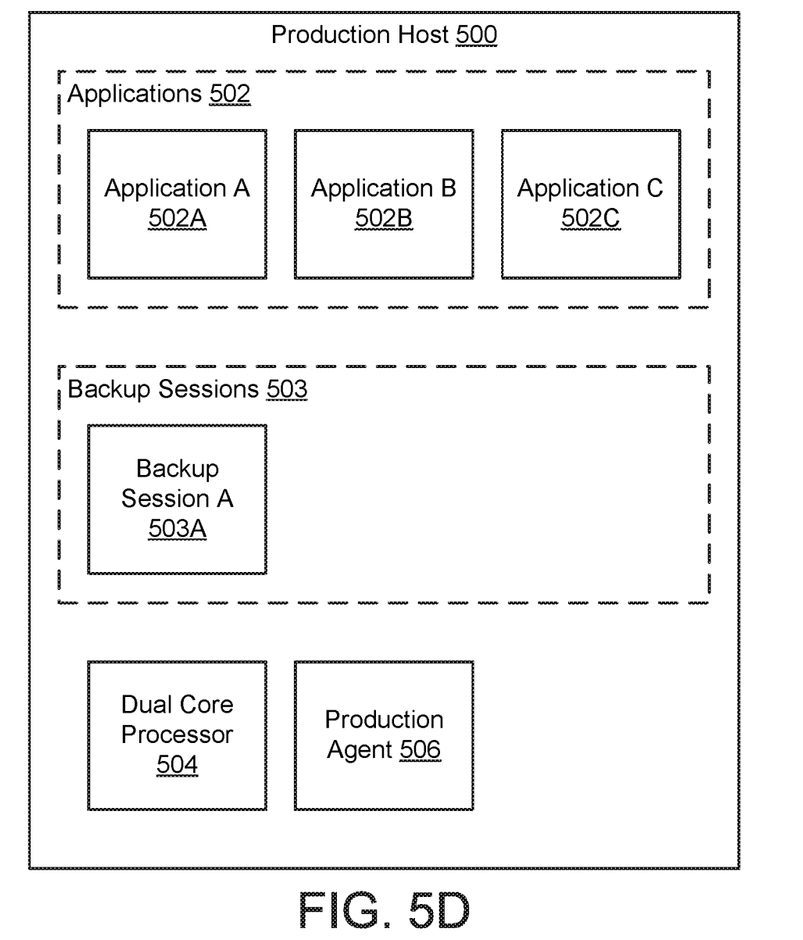
FIG. 5D shows a diagram of the example system of FIG. 5A at a fourth point in time.

At a fourth point in time, another backup policy triggers another backup generation sessions and the production (506) only instantiates a single backup sessions (503A) as illustrated in FIG. 5D. Due to the lower computing load placed on the production host (500), the quality of service provided by the applications (502) is maintained during the backup generation but the backup generation time is extended because the computing resources of the production host were underutilized.

END OF EXAMPLE

Figure 6:
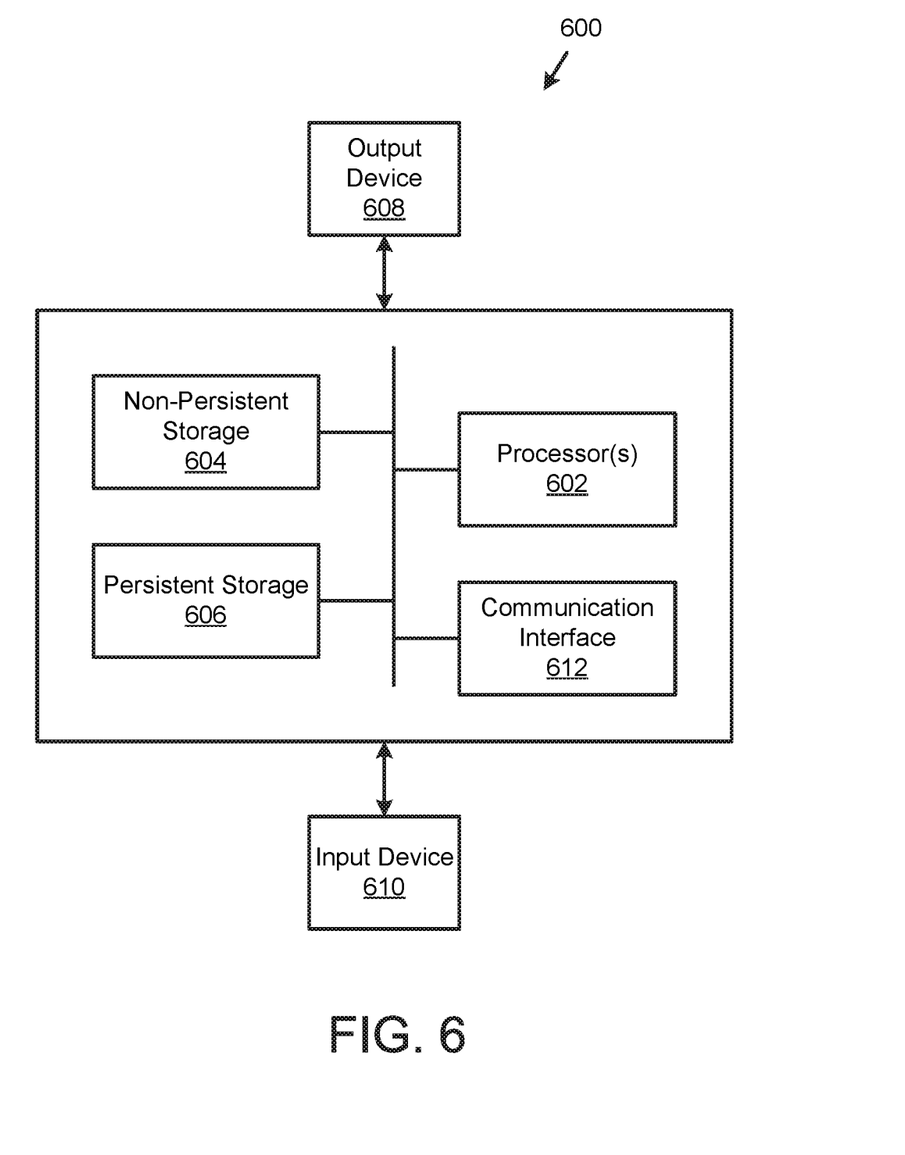
FIG. 6 shows a diagram of a computing device in accordance with one or more embodiments of the invention.

As discussed above, embodiments of the invention may be implemented using computing devices. FIG. 6 shows a diagram of a computing device in accordance with one or more embodiments of the invention. The computing device (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), input devices (610), output devices (608), and numerous other elements (not shown) and functionalities. Each of these components is described below.

In one embodiment of the invention, the computer processor(s) (602) may be an integrated circuit for processing instructions. For example, the computer processor(s) may be one or more cores or micro-cores of a processor. The computing device (600) may also include one or more input devices (610), such as a touchscreen, keyboard, mouse, microphone, touchpad, electronic pen, or any other type of input device. Further, the communication interface (612) may include an integrated circuit for connecting the computing device (600) to a network (not shown) (e.g., a local area network (LAN), a wide area network (WAN) such as the Internet, mobile network, or any other type of network) and/or to another device, such as another computing device.

In one embodiment of the invention, the computing device (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve methods for generating backups of applications in a distributed system. In particular, embodiments of the invention may provide an automated method for allocation resources for backup generation purposes. Embodiments of the invention may uniquely tailor the number of backup generations sessions performed concurrently on each production host to maximize efficiency in terms of both time and computing resource utilization. As discussed above, performing too few or too many backup generation sessions may negatively impact backup generation. By tailoring the computing resource allocations for backup generation purposes on a per application level, embodiments of the invention may provide an improved distributed system that more efficiently utilizes computing resources than contemporary systems. Similarly, embodiments of the invention may address the problem of heterogeneity in computing resources within distributed systems by determining resource utilization allocations on a per device level basis.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A backup agent for generating backups, comprising:
   a persistent storage that stores backup/restoration policies; and
   a backup manager programmed to:
   obtain production host computing resource characteristics associated with production hosts;
   perform a computing resource analysis of the production host computing resource characteristics to obtain resource profiles for each of the production hosts;
   perform an availability analysis of the obtained resource profiles to determine an application-level computing resources distribution for generating the backups;
   coordinate generating the backups using the application-level computing resource distribution and the backup/restoration policies to obtain the backups by:
      generating backup initiation instructions for each production host based on a corresponding policy of the backup/restoration policies and the application-level computing resource distribution by identifying an administrator-specified maximum number of sessions of a first policy of the backup/restoration policies; and
      sending the generated backup initiation instructions to corresponding production agents of the production hosts; and
   store the obtained backups in backup storage.

2. The backup agent of claim 1, wherein the production host computing resource characteristics is a cardinality of a total number of processing cores of each respective production host.

3. The backup agent of claim 1, wherein performing the computing resource analysis of the production host computing resource characteristics to obtain resource profiles for each of the production hosts comprises:
   identifying a maximum availability of a plurality of computing resources for each of the production hosts; and
   storing each respective plurality of computing resources in a corresponding resource profile of the resource profiles.

4. The backup agent of claim 1, wherein performing the availability analysis of the obtained resource profiles to determine an application-level computing resources distribution for generating the backups comprises:
   identifying a limiting resource of each of the production hosts using the obtained resource profiles;
   determining a maximum number of concurrent backup generation sessions for each of the production hosts based on the identified limiting resource of each of the production hosts; and
   storing the maximum number of concurrent backup generation sessions for each of the production hosts as the application-level computing resources distribution.

5. The backup agent of claim 1, wherein generating the backup initiation instructions for each production host based on the corresponding policy of the backup/restoration policies and the application level computing resource distribution is further performed by:
   obtaining the first policy that corresponds to a first production host of the production hosts;
   identifying a first maximum number of sessions for the first production host specified by the application-level computing resource distribution;
   making a determination that the first maximum number of sessions is larger than the administrator-specified maximum number of sessions; and
   specifying the administrator-specified maximum number of sessions for the first production host in the backup initiation instructions.

6. The backup agent of claim 1, wherein generating the backup initiation instructions for each production host based on the corresponding policy of the backup/restoration policies and the application level computing resource distribution is further performed by:
- obtaining the first policy that corresponds to a first production host of the production hosts;
- identifying a first maximum number of sessions for the first production host specified by the application-level computing resource distribution;
- making a determination that the first maximum number of sessions is smaller than the administrator-specified maximum number of sessions; and
- specifying the first maximum number of sessions for the first production host in the backup initiation instructions.

7. The backup agent of claim 1, wherein the backups are associated with applications executing on the production hosts.

8. The backup agent of claim 1, wherein the backup storage is separate from the backup agent.

9. The backup agent of claim 8, wherein the production hosts are separate from the backup storage.

10. The backup agent of claim 1, wherein the production host computing resource characteristics associated with the production hosts are obtained in response to a policy of the backup/restoration policies being triggered.

11. The backup agent of claim 10, where the policy of the backup/restoration policies is triggered by an occurrence of a predetermined event.

12. The backup agent of claim 11, wherein the predetermined event is a predetermined point in time.

13. A method for generating backups, comprising:
- obtaining production host computing resource characteristics associated with production hosts;
- performing a computing resource analysis of the production host computing resource characteristics to obtain resource profiles for each of the production hosts;
- performing an availability analysis of the obtained resource profiles to determine an application-level computing resources distribution for generating the backups;
- coordinating generating the backups using the application-level computing resource distribution and backup/restoration policies to obtain the backups by:
  - generating backup initiation instructions for each production host based on a corresponding policy of the backup/restoration policies and the application-level computing resource distribution by identifying an administrator-specified maximum number of sessions of a first policy of the backup/restoration policies; and
  - sending the generated backup initiation instructions to corresponding production agents of the production hosts; and
- storing the obtained backups in backup storage.

14. The method of claim 13, wherein performing the computing resource analysis of the production host computing resource characteristics to obtain resource profiles for each of the production hosts comprises:
- identifying a maximum availability of a plurality of computing resources for each of the production hosts; and
- storing each respective plurality of computing resources in a corresponding resource profile of the resource profiles.

15. The method of claim 13, wherein performing the availability analysis of the obtained resource profiles to determine an application-level computing resources distribution for generating the backups comprises:
- identifying a limiting resource of each of the production hosts using the obtained resource profiles;
- determining a maximum number of concurrent backup generation sessions for each of the production hosts based on the identified limiting resource of each of the production hosts; and
- storing the maximum number of concurrent backup generation sessions for each of the production hosts as the application-level computing resources distribution.

16. A non-transitory computer readable medium comprising computer readable program code, which when executed by a computer processor enables the computer processor to perform a method for generating backups, the method comprising:
- obtaining production host computing resource characteristics associated with production hosts;
- performing a computing resource analysis of the production host computing resource characteristics to obtain resource profiles for each of the production hosts;
- performing an availability analysis of the obtained resource profiles to determine an application-level computing resources distribution for generating the backups;
- coordinating generating the backups using the application-level computing resource distribution and backup/restoration policies to obtain the backups by:
  - generating backup initiation instructions for each production host based on a corresponding policy of the backup/restoration policies and the application-level computing resource distribution by identifying an administrator-specified maximum number of sessions of a first policy of the backup/restoration policies; and
  - sending the generated backup initiation instructions to corresponding production agents of the production hosts; and
- storing the obtained backups in backup storage.

17. The non-transitory computer readable medium of claim 16, wherein performing the computing resource analysis of the production host computing resource characteristics to obtain resource profiles for each of the production hosts comprises:
- identifying a maximum availability of a plurality of computing resources for each of the production hosts; and
- storing each respective plurality of computing resources in a corresponding resource profile of the resource profiles.

18. The non-transitory computer readable medium of claim 16, wherein performing the availability analysis of the obtained resource profiles to determine an application-level computing resources distribution for generating the backups comprises:
- identifying a limiting resource of each of the production hosts using the obtained resource profiles;
- determining a maximum number of concurrent backup generation sessions for each of the production hosts based on the identified limiting resource of each of the production hosts; and
- storing the maximum number of concurrent backup generation sessions for each of the production hosts as the application-level computing resources distribution.

* * * * *